US009021370B1

(12) United States Patent
Carlson

(10) Patent No.: US 9,021,370 B1
(45) Date of Patent: Apr. 28, 2015

(54) COLLABORATIVE CHAT ROOM MEDIA PLAYER WITH RECOMMENDATIONS

(75) Inventor: Adam Carlson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 788 days.

(21) Appl. No.: 12/725,567

(22) Filed: Mar. 17, 2010

(51) Int. Cl.
*G06F 3/00* (2006.01)
*G06Q 30/06* (2012.01)

(52) U.S. Cl.
CPC .................................. *G06Q 30/0607* (2013.01)

(58) Field of Classification Search
CPC ....... G06F 3/0481; G06F 17/30; H04L 12/58; H04L 17/30
USPC .................................. 715/753, 751, 758, 759
See application file for complete search history.

(56) References Cited

U.S. PATENT DOCUMENTS

| | | | | |
|---|---|---|---|---|
| 7,562,117 | B2 * | 7/2009 | Rosenberg | 709/205 |
| 8,099,334 | B1 * | 1/2012 | Stockwell | 705/26.1 |
| 2003/0037157 | A1 * | 2/2003 | Pestoni et al. | 709/231 |
| 2004/0041836 | A1 * | 3/2004 | Zaner et al. | 345/751 |
| 2006/0190829 | A1 * | 8/2006 | Zaner et al. | 715/751 |
| 2006/0224971 | A1 * | 10/2006 | Paulin et al. | 715/758 |
| 2008/0229215 | A1 * | 9/2008 | Baron et al. | 715/751 |
| 2009/0089327 | A1 * | 4/2009 | Kalaboukis et al. | 715/840 |
| 2009/0187936 | A1 * | 7/2009 | Parekh et al. | 725/25 |
| 2009/0222392 | A1 * | 9/2009 | Martin et al. | 706/46 |
| 2009/0249222 | A1 * | 10/2009 | Schmidt et al. | 715/751 |
| 2010/0228740 | A1 * | 9/2010 | Cannistraro et al. | 715/700 |
| 2010/0306671 | A1 * | 12/2010 | Mattingly et al. | 715/753 |

* cited by examiner

*Primary Examiner* — Dino Kujundzic
(74) *Attorney, Agent, or Firm* — Lee & Hayes, PLLC

(57) ABSTRACT

A collaborative chat room media player may enable a user to create or join a virtual lounge for a group of remotely located members to share a media experience. The virtual lounge may include a media player, an interactive communication component (e.g., instant messaging, comment board, blog, etc.), and a collaborative music queue and/or playlist. The media player may provide and/or make available recommendations to the members of the group. For example, the members may populate a playlist with media content from their media library. The media player may then add recommendations to the playlist based on the groups interests (media content selection, media content ownership, etc.). The members may vote on the content in the playlist and influence, via collaboration, when (or if) a piece of media content is played to the group.

26 Claims, 8 Drawing Sheets

| ARTIST | TITLE | ALBUM | MEMBER | YES | NO | TOTAL | STATUS |
|---|---|---|---|---|---|---|---|
| DEAN S. | GOOD TIMES | DEBUT | KEITH | ☒ | ☐ | +2 | 2 OF 6 ★★☆☆☆☆ |
| G. BROOKS | AIN'T GOING | TIME | AMY | ☒ | ☐ | +3 | 4 OF 6 ★★★★☆☆ |
| XXXXXXXX XXXXXXXXX XXXXXXXXX | XXXXXXXXX XXXXXXXXXX XXXXXXXXXX | XXXXX XXXXX XXXXX | XXXX XXXX XXXX | ☐ | ☐ | 0 | 0 OF 6 ☆☆☆☆☆☆ |
|  |  |  |  | ☒ | ☐ | -1 | 5 OF 6 ★★★★★☆ |
|  |  |  |  | ☐ | ☒ | -2 | 1 OF 6 ★☆☆☆☆☆ |

FIG. 5

COLLABORATIVE CHAT ROOM MEDIA PLAYER WITH RECOMMENDATIONS

BACKGROUND

People have many options when selecting a source and forum to access media. Media content may be received by a broadcast (streaming, cable, over-the-air), via a live performance, or by playing an owned copy of the media content (physical medium or digital recording). Each of these sources may be conducive to one or more forums, such as a private residence, a concert hall, etc. Further, each of these sources has advantages and disadvantages for a recipient. For example, some sources or means of distribution do not allow you to alter a playlist (e.g. over-the-air), while other sources are not favorable to sharing of the media content because of physical barriers (e.g., physically owned copies).

People often enjoy experiencing the media with other people, such as at a movie theater, concert, or at other possible forums. These events are enjoyable because attendees can discuss the media and sensory experience with other similarly situated people. People may experience similar levels of enjoyment at home when watching videos or listening to music with other people. Besides the enjoyment of the media content of the videos and/or music, the discussion amongst attendees can be an important and enjoyable aspect of a person's overall experience. However, people often experience these forms of media in isolation of others and thus lack the discussion and social aspects that can add to one's experience.

One advantage of discussion with others is an ability to learn about new and related media content of interest. For example, when watching a movie, a friend may tell you that the movie reminds her of a previous movie that she saw last year. If you like the current movie, you may consider renting the previous movie next week, thereby adding to your enjoyment of the original experience (albeit retrospectively). In the same context, movie theaters typically run trailers that precede a feature movie, which are often selected based on the feature movie and are used to educate people about other movies they may enjoy. Again, many people enjoy these trailers and believe they add to the overall enjoyment of a particular media experience.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 is an illustrative queue that enables collaborative promotion/demotion of media content based on member feedback.

DETAILED DESCRIPTION

Overview

As discussed above, people have many options when selecting a source and forum to access media content; however, some options result in the user being isolated from other people. This disclosure describes a collaborative chat room media player with recommendations that allows users to enjoy media with one another, rather than in isolation from other people. The collaborative chat room media player may enable a user to create or join a networked environment ("virtual lounge") for a group of remotely located people to share a media experience. The virtual lounge may include a media player, an interactive communication component (e.g., instant messaging, comment board, blog, etc.), and a collaborative music queue and/or playlist. The media player may provide and/or make available recommendations to the members, which may be played by the media player. For example, the members may populate a playlist with media content from their media library. The media player may then add recommendations to the playlist based on the group's interests (content selection, content ownership, etc.). Members may vote on the content in the playlist and influence, via collaboration, when (or if) a piece of media content is played to the group.

The techniques and systems described herein may be implemented in a number of ways. Example implementations are provided below with reference to the following figures.

Illustrative System

Figure 1:
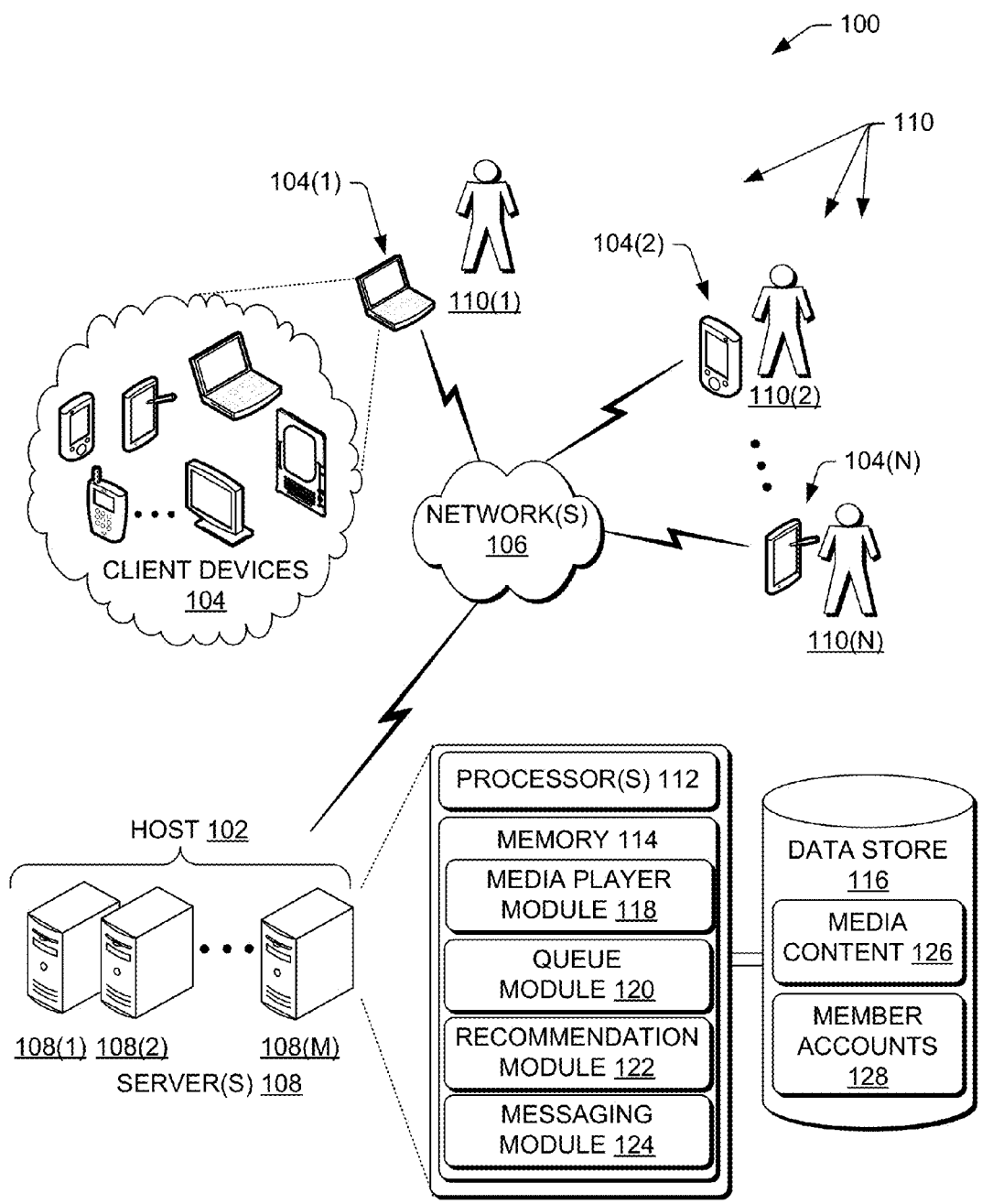
FIG. 1 is a schematic diagram of an illustrative computing environment to provide a collaborative chat room media player with recommendations.

FIG. 1 is a schematic diagram of an illustrative computing environment 100 that includes a collaborative chat room media player with recommendations. The environment includes a host 102 in communication with client devices 104 ("clients") via a network 106. The host 102 may be implemented on one or more servers 108(1), . . . , 108(M), perhaps arranged as a server farm. Other server architectures may also be used to implement the host 102. The host 102 is capable of handling requests from many members and serving, in response, various information and data to the clients 104. The network 106 is representative of many different types of networks, such as cable networks, the Internet, local area networks, mobile telephone networks, wide area networks and wireless networks, or a combination of such networks.

Members 110(1), 110(2), . . . , 110(N) (collectively "the members 110") may interact with the clients 104(1), 104(2), . . . , 104(N), respectively, to exchange data across the network 106 with the host 102. The clients 104(1)-(N) may be implemented in any number of ways. In FIG. 1, the clients 104 are illustrated as a personal computer (e.g., laptop, tablet, desktop, etc.), a wireless telephone (e.g., smartphone), a television set-top box, a portable digital assistant (PDA), a game console, electronic book readers, and other electronic or entertainment devices capable of interacting with a host.

The members employ the clients 104 to interact with the host 102. In one scenario, one of the clients 104(1)-(N) sends a request to the servers 108(1)-(M). The request may be a uniform resource identifier (URI) request or other types of requests. Upon receiving the request, the servers 108(1)-(M)

may return a page (or other communication) to a requesting one of the clients 104(1)-(N), allowing a respective member to interact with the data provided by the servers. The servers 108(1)-(M) may transmit media content to the members via a broadcast (e.g., data stream). The servers 108(1)-(M) may also transmit/receive messaging (e.g., text, audio, and/or video), images, and other data associated with a chat room media player. A browser or dedicated applications may be used to interact with the host 102.

As illustrated, the servers 108(1)-(M) are equipped with one or more processors 112 and memory 114. In addition, the servers 108(1)-(M) may have access to a data store 116 that includes various data such as a library of media content (e.g., audio files, video files, documents, etc.), member account information, and so forth.

The memory 114 may include applications, modules, and/or data. In some embodiments, the memory 114 may include a media player module 118, a queue module 120, a recommendation module 122, and a messaging module 124, each described in turn.

The media player module 118 may enable the members 110 to receive media content via a broadcast (e.g., data stream) from the host 102. The media player module 118 may access the data store 116 to access media content 126 via a library of media. The media player module 118 may facilitate providing substantially synchronous distribution of the media content to the clients 104 such that each of the members 110 may receive the media content at about the same time. In this way, the members 110 may comment and interact with one another about the media content without confusion. In some embodiments, the media player module 118 may also manage a sequentially ordered playlist of media content.

The queue module 120 may manage and/or store a selection of the media content 126 for possible use by the media player module 118. In some embodiments, the queue module 120 may enable the members 110 to add selected instances of the media content 126 into a queue. The members 110 may collaborate on the selected instances by adding further instances of media content, voting on selected media content, or taking other actions to ultimately determine an order or occurrence of media content that is played by the media player module 118.

The recommendation module 122 may generate recommendations based in part on the media content 126, the selections managed by the queue module 120, or a combination thereof. In some embodiments, the recommendation module 122 may provide media content that is not owned by any of the members 110, but may be desired by one or more of the members 110 based on interactions with the host 102. The recommendation module 122 may add media content to the queue via the queue module 120, which may ultimately be played by the media player module 118.

The messaging module 124 may enable the members 110 to interactively exchange messages via a messaging board. In this way, the messaging module may create a virtual forum for the members 110 to comment on the selections in the queue and/or the media content being played by the media player module 118, converse on other topics, and so forth. The messages may be associated with member accounts 128 stored in the data store 116.

In some embodiments, the computing environment may be arranged as a peer-to-peer (P2P) environment where some or all of the modules 118-124 may reside on each member's computing device. The computing devices may share media content to facilitate synchronous or near synchronous playing of the media across the member computing devices. For example, a temporary copy of a shared piece of media content may be uploaded from a library of a member, and made available for limited use by other members during a synchronized playing of the media content. Similarly, such a peer-to-peer environment may support messaging among the members during the playing of the media content.

Illustrative Interfaces

Figure 2:
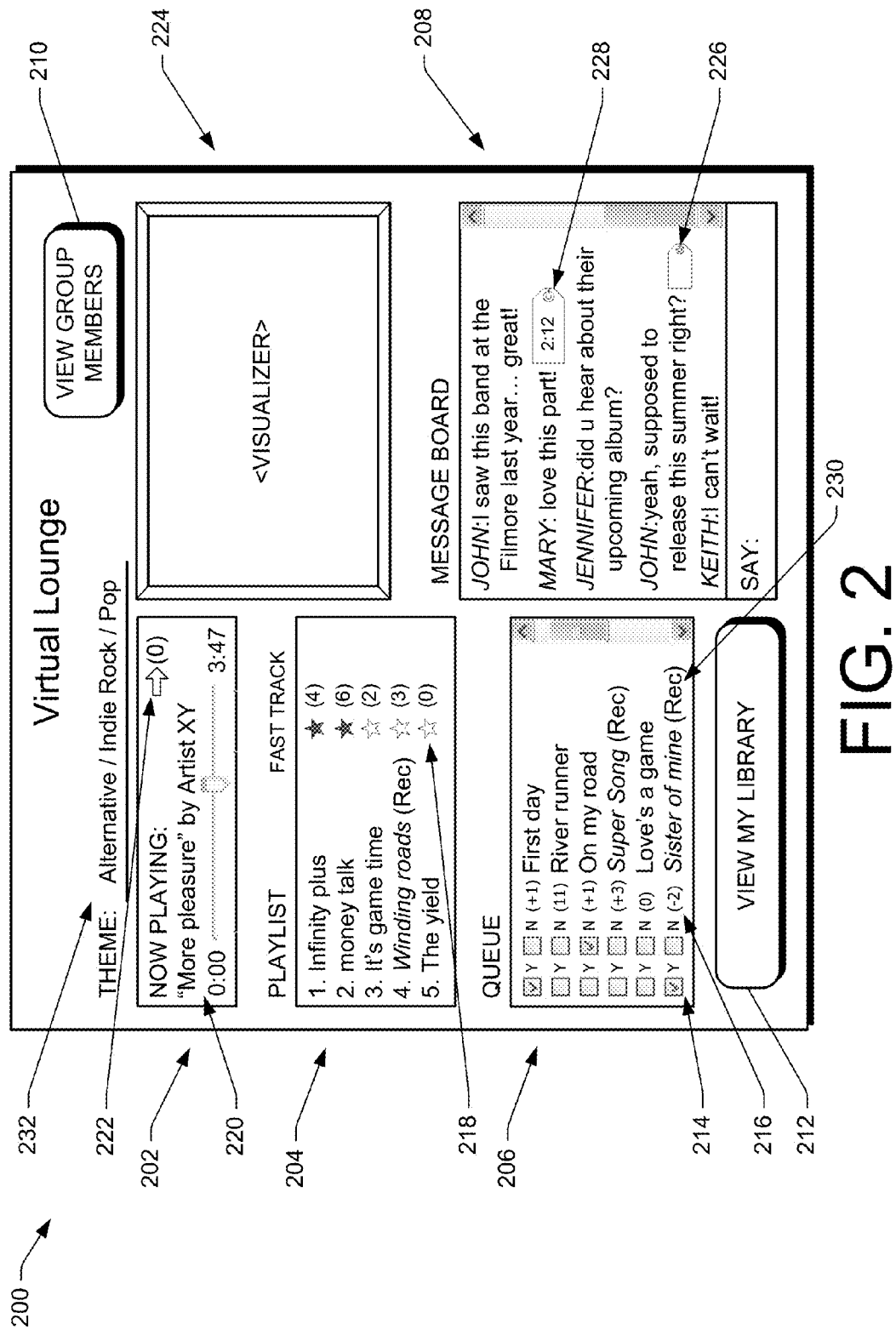
FIG. 2 is an illustrative user interface of a virtual lounge having a media player where the virtual lounge enables collaboration and messaging between members and provides recommendations of media content.

FIG. 2 is an illustrative user interface of a virtual lounge 200 (networked environment) having a media player where the virtual lounge enables collaboration and messaging between members and provides recommendations of media content. The virtual lounge 200 may include various sections that may include a media player 202, a playlist 204, a queue 206, and a message board 208.

A member link 210 may enable a member to view the current members 110 of the virtual lounge 200. Each of the members 110 may own media content, which the member may access via a library button 212. The media content of the member libraries may be uploaded to the data store 116 in advance of the group formation or during interaction with the virtual lounge 200. The uploading may include uploading an entire file or uploading an identifier of the file when the data store has a copy of the file (e.g., data store has master library of media content). The uploading may be performed in conjunction with a survey process to identify media content owned by the members (e.g., stored on member storage device, stored with a host in a cloud, etc.).

The members 110 may select media content for inclusion in the queue 206. After media content is placed (or otherwise indicated) in the queue 206, the members may collaborate to influence which pieces of media content in the queue are ultimately played by the media player 202 and when they are played (if at all). In some embodiments, the members 110 may allocate votes 214 to some or all of the media content in the queue 206. For example, each member may select a "yes" or a "no" designation for a piece of media content as one of the votes 214. Other allocations of the votes 214 may be used (e.g., star rating, numeric values, etc.). The votes 214 may be aggregated as a vote total 216, which may determine when (or if) the piece of media content is promoted and/or ultimately played by the media player 202, possibly based on one or more threshold values. For example, the virtual lounge 200 may dynamically update (refresh) such that the vote total 216 is updated each time a new vote 214 is submitted in the queue 206 or other location in the virtual lounge 200.

In some embodiments, media content may advance from the queue 206 to the playlist 204. For example, when a piece of media content receives enough "yes" votes to generate the vote total 216 that reaches a threshold value, then the corresponding piece of media content may be promoted to the playlist 204 and ultimately be played by the media player 202 (e.g., via a sequentially ordered queue or sub-queue). The playlist 204 (and/or the queue 206) may include a promotion button 218 to fast track (i.e., quickly advance) a song to the top of the playlist 204. In some embodiments, only members that own a particular piece of media content are enabled (privileged) to use the promotion button 218 to fast track the respective owned media content. In various embodiments, and when multiple members have access to the promotion button 218, media content may be fast tracked (promoted up the playlist 204) after a threshold number of member selections of the promotion button 218. In various embodiments, some members may have additional right or privileges based on various factors such as an established status in the group, amount of contributed media content, and so forth, and accordingly have privileges that affect a number of votes (or ability to vote) and/or use the fast track option via the promotion button 218.

In some embodiments, the playlist 204, media player 202, and/or the queue 206 may include a purchase option 219. The purchase option 219 may enable the user to buy the media (full rights, single use, etc.). The purchase option 219 may also influence member privileges to allow fast track of the media content or otherwise reorder or advance the media content via the voting process.

The media player 202 may include an attribute display 220 of a currently played piece of media content. The attribute display 220 may include details of piece of media content that is being played, such as an artist, duration, and so forth. In some embodiments, the media player 202 may enable the members to skip the currently played piece of media content via a skip button 222. In various embodiments, the members may collectively vote to skip to a next piece of media content in the playlist 204. The skip button 222 may incorporate a threshold number of member selections (where each member can click it once, etc.) before the currently played piece of media content is skipped by the media player 202.

In some embodiments, the virtual lounge 200 may also include a visualizer 224. The visualizer 224 may render a display that is made viewable to the members 110. For example, the visualizer 224 may play videos, present still images, and/or show graphical renderings along with music.

The various features described above enable collaboration between the members 110 of the virtual lounge 200 to influence what media content is played and when it is played. In this way, a single member may not be able to control the operation of the media player 202, the playlist 204, and/or the queue 206. The possible content may originate from a collective library that encompasses the cumulative media content owned (or controlled) by the members 110.

The message board 208 may further assist the collaboration of the queue 206, the playlist 204, and/or the media player 202, or may otherwise enhance communications between the members 110. For example, one of the members 110(1) may comment on an artist, suggest a related piece of media content, provide further information on a topic, and so forth. A member may also rally other members to take preferred voting actions, such as to skip a currently played piece of media content, fast track a song to the top of the playlist 204, and so forth. In some embodiments, tags (e.g., metadata) may be associated with messages in the message board. A generic tag 226 may indicate an association with the media content while a time tag 228 may indicate an association with a specific elapsed portion of the media content.

In accordance with one or more embodiments, the recommendation module 122 may add a recommendation 230 to the queue 206. The recommendation 230 is a piece of media content that is selected by the recommendation module 122 based on the member interactions in the listening lounge 200. For example, the recommendation module 122 may analyze the voting behavior of the members 110 to determine media content the members may enjoy, and then add a recommendation to the queue 206. The recommendation module 122 may also add media content based on other factors such as the media content of the libraries of the members 110, a theme 232 of the virtual lounge 200, and so forth. The recommendation 230 may or may not be a piece of media content available via any of the libraries accessible via the library button 212

In some embodiments, the virtual lounge 200 may combine the features of the queue 206 and the playlist 204. In such an implementation, the queue 206 may order pieces of media content based on the votes, where the top rated piece of media content may be played next by the media player 202.

Figure 3:
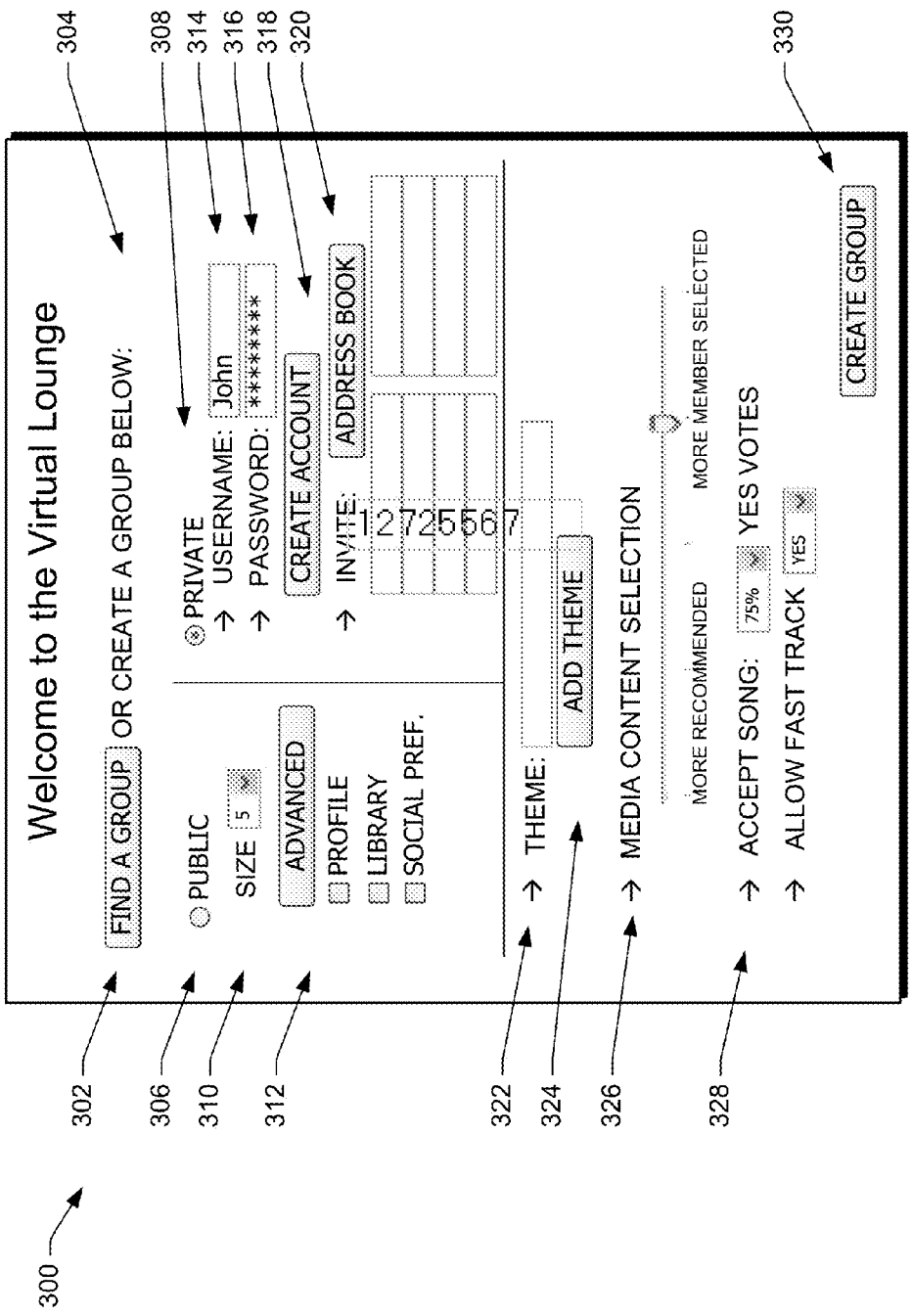
FIG. 3 is an illustrative user interface to initiate or join a chat room media player group.

FIG. 3 is an illustrative user interface of a group initiation 300 to initiate or join a chat room media player group. A user (prior to becoming a member) may begin an interaction with the virtual lounge 200 via the group initiation 300. A user may be presented with an option to find a group 302 or create a group 304 (or "virtual lounge"). When searching for a group, the user may be presented with criteria for matching to a current group, a list of groups, and so forth. A discussion of creating a group 304 follows.

In accordance with some embodiments, a user may create a public group 306 (i.e., no invite) or a private group 308 (i.e., invitation-based). When the user creates a public group 306, the user may select a group size 310. In some embodiments, the group size 310 may be limited to a maximum size limit, such as to limit an extent of a cumulative library based on the members of the group. In some instances, advanced criteria 312 may be used when forming the public group 306 such as by using profile matches (e.g., member account data), library matches, social preference matches (possibly from social networking site data), and so forth.

When the user selects the private option 308, the user may be required to log in with a username 314 and password 316 or create an account 318. The user may extend invitations 320 to invite friends or others to become one of the members 110 of the group.

Regardless of whether the user selects a public group 306 or a private group 308, additional attributes may be selected by the user. The user may use a theme selector 322 to select the theme 232 for the listening lounge 200. Additional themes (combinations, etc.) may be added via an added theme selector 324.

In accordance with various embodiments, the user may determine a media content selection 326. The user may select a point along a spectrum of more recommended selections (via the recommendation module 122) and more user selected media content (by members adding media content to the queue 206). Other selection techniques may be used to determine a percent of recommendations. The user may also determine preferences for aspects of the collaboration via voting attribute selectors 328.

The selections of the group initiation 300 are provided for illustrative purposes. Additional features may be added or removed, such as additional voting restrictions for the voting attribute selectors 328, and so forth. Thus, the group initiation 300 is not limited to the specific features (inputs) shown in FIG. 3, but instead the features shown in FIG. 3 are an example of possible features used to form the virtual lounge 200 shown in FIG. 2.

When the user is ready to form the new group and enter the listening lounge 200 as a member, the user may select a create group button 330. Additional members, via the invite or the public option 306, may also join the virtual lounge 200.

Illustrative Embodiments

Figure 4:
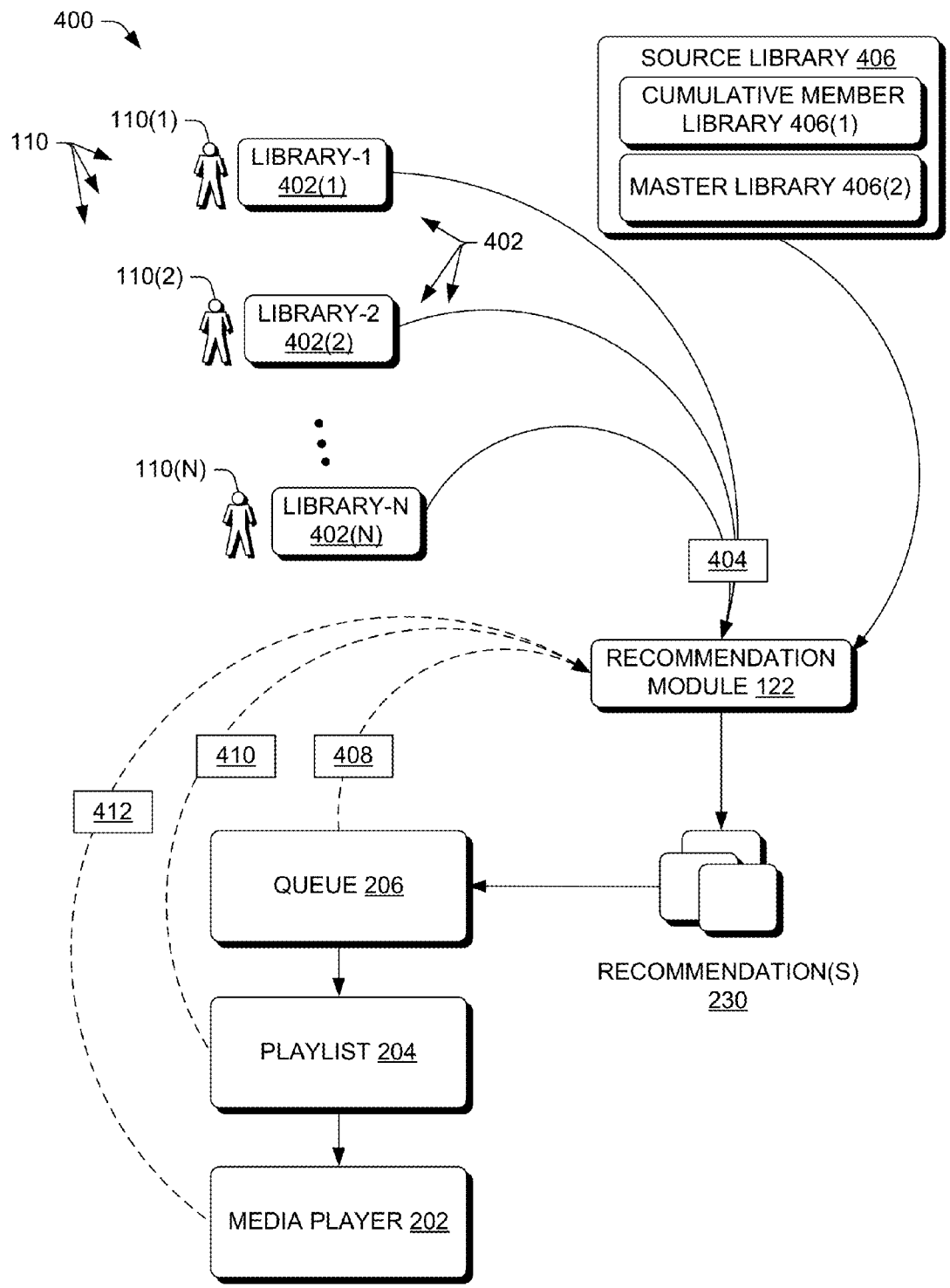
FIG. 4 is a schematic diagram of a recommendation process to populate a queue of media content with recommendations.

FIG. 4 is a schematic diagram of a recommendation process 400 to populate a queue of media content with recommendations. Each of the members 110(1), 110(2), ..., 110(N) may have a corresponding library 402(1), 402(2), ..., 402(N) of media content, respectively. As discussed above, the media content of the libraries 402 may be uploaded to the data store 116, identified by a verification process, acquired via the listening lounge or related service(s), or acquired via similar processes. In some embodiments, the members may purchase media content via the virtual lounge 200.

The members may add media content from their libraries into the queue to populate the queue 206. In some embodiments, the members 110 may also add selections from libraries of the other members into the queue 206. In addition to the member selected media content, the queue 206 may also include the recommendations 230.

In accordance with some embodiments, the recommendation module 122 may analyze the media content of the libraries 402 (including individual libraries 402(1)-(N)) at 404. The recommendation module 122 may create the recommendations 230 by determining trends across the libraries 402. In some embodiments, the recommendations module 122 may choose recommendations 230 using the theme 232, which may exclude some media content of the libraries 402 from becoming or influencing the recommendations.

In various embodiments, the recommendations 230 may be accessed from a source library 406. The source library 406 may include a cumulative member library 406(1), which may include the media content of the libraries 402(1)-(N). The source library 406 may also include a master library 406(2), which may include media content that may or may not be included in the libraries 402(1)-(N). After the recommendation module 122 generates the recommendations 230 and retrieves the recommendation from the source library 406, the recommendations may be added to the queue 206.

In some embodiments, a quantity or percent of recommendations 230 that may be added to the queue 206 is determined based on a threshold such as the media content selection 326 of FIG. 3. For example, when the media content selection 326 is set to approximately one recommendation for every four member selections, a new recommendation may be added to the queue 206 after a fourth consecutive member selection is added to the queue. However, the recommendations 230 may also be added to the queue 206 using a randomized schedule and still generally adhere by the media content selection 326 or other threshold.

As discussed above, some or all of the media content of the queue 206 may be promoted to a playlist 204 and then played by the media player 202 based in part on member activity in the virtual lounge 200. The promotion and playing of the media content may be influenced by member collaboration, such as by voting, using fast track options, skipping media content, and other operations described herein. Each of these collaborative events may be analyzed by the recommendation module 122 and influence the selection of recommendations 230 as discussed next in operations 408, 410, and 412.

At 408, the recommendation module 122 may analyze member interactions with the queue 206 to influence selection of the recommendations 230. In some embodiments, the recommendation module 122 may weigh media content that receives votes (positive, negative, or both) more heavily when generating the recommendations 230, thereby tailoring the recommendations 230 based on the member collaboration.

At 410, the recommendation module 122 may analyze member interactions with the playlist 204 to influence selection of the recommendations 230. In various embodiments, the recommendation module 122 may weight media content with activity associated with the promotion button 218 to more heavily when generating the recommendations 230, thereby tailoring the recommendations 230 based on the member collaboration.

At 412, the recommendation module 122 may analyze member interactions with the media player 202 to influence selection of the recommendations 230. In some embodiments, the media content that is skipped (or receives votes to be skipped) may be more heavily weighted (negatively) when generating the recommendations 230. Accordingly, the recommendation module 122 may use both positive collaborative information (vote for yes, promotion, etc.) to select the recommendations 230 from the source library 406 and may use negative collaborative information (vote for no, skip in media player, etc.) to avoid selection of media content as part of the recommendations 230.

FIG. 5 is an illustrative queue 500 that enables collaborative promotion/demotion of media content based on member feedback. The queue 500 may include attribute information (e.g., headers) to identify a selection of media content. As shown in FIG. 5, the media content is illustrated as music; however, the queue may include different attribute information for different types of media content (e.g., videos, still images, documents, audio lectures, etc.).

As shown in FIG. 5, the attribute information may include an artist 502, a title 504, and/or an album 506 (or specific work). The queue 500 may show the member 508 that selects the media content. When the media content is a recommendation, the member 508 may be listed as "N/A", "Recommendation", etc.

The queue 206 may also include a member interactive portion to enable the members to collaborate on the media content in the queue. A voting section 510 may enable the members to provide positive or negative feedback for a selection of media content. The voting selection may use yes/no votes, a numeric scale, a star rating (e.g., select number of stars 1 to 5), etc. A vote total 512 may show the cumulative result of the vote section 510 across all the members. For example, the vote total 512 may reflect a positive number when more positive votes are received and a negative number when more negative votes are received for the respective selection. A status section 514 may provide feedback on the number of member votes received for the selection. In some embodiments, a promotion (fast track) button 516 may enable rapid promotion of the selection, thus expediting play of the selection by the media player 202.

In some embodiments, the members 110 may be allocated a predetermined number of votes and/or promotions, which may be replenished after an elapse of time, addition of new media content in the queue, trading via the message board, or by other factors. Further, various information in the queue 500 may be dynamically updated after member interaction (e.g., submission of a vote, etc.). In embodiments where the queue 500 performs functions selected from the queue 206 and the playlist 204, the queue 500 may include a dynamic ordering of the selections such that the highest ordered selection may be played next by the media player 202. For example, when a selection of media content in the middle of the queue 500 receives a threshold number selection of the promotion button 516, the selection of media content may move to the top or near the top of the queue to reflect a shorter duration until play by the media player 202.

Illustrative Operation

Figure 6:
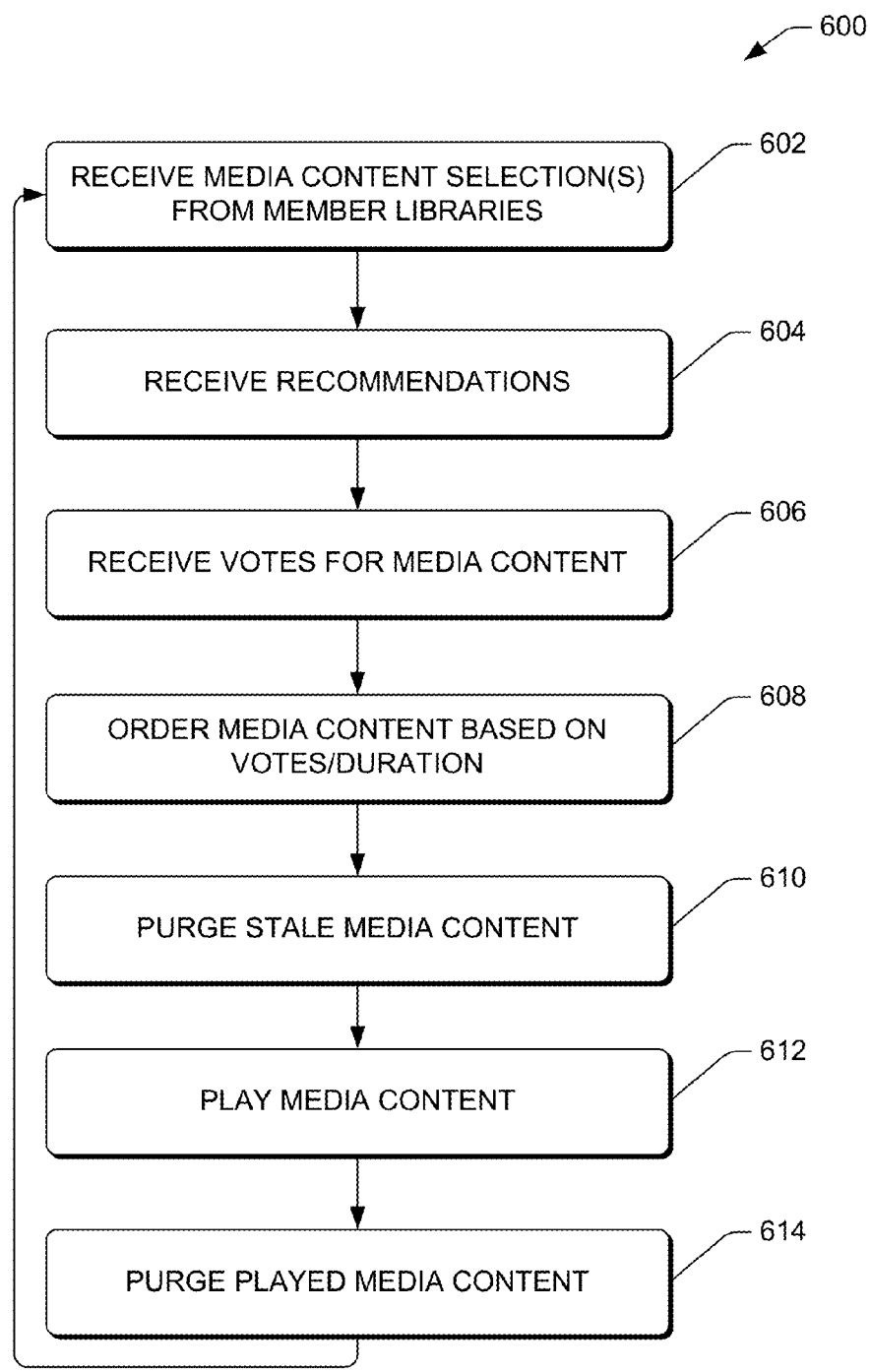
FIG. 6 is a flow diagram of an illustrative process to manage a queue of a collaborative media player.

FIG. 6 is a flow diagram of an illustrative process 600 to manage a queue of a collaborative media player. The process 600 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure (e.g., processes 700 and 800, etc.), in addition to process 600, shall be interpreted accordingly.

At 602, the queue module 120 may receive media content selections from member libraries 402. The members 110 may designate selections of the media content for inclusion in the queue, such as via the library button 212 in FIG. 2.

At 604, the queue module 120 may receive recommendations 230 from the recommendation module 122. The recommendations 230 may be based in part on the theme 232 of the virtual lounge 200, the media content of the member libraries 402, the member selections to the queue 206, the collaboration of the members (e.g., voting, etc.), and so forth.

At 606, the queue module 120 may receive votes for the media content in the queue 206. For example, the members 110 may submit votes in the queue 500 shown in FIG. 5, use the promotion button 516, and otherwise vote on the media content.

At 608, the queue module 120 and/or the media player module 118 may order media content based on votes and/or a predetermined duration of pieces of media content in the queue 206 or playlist 204. For example, some pieces of media content may be ordered based on votes, receipt of a promotion (via the promotion button 516), or based on a duration in the queue 206.

At 610, the queue module 120 may purge stale media content from the queue 206. For example, pieces of media content that include negative, null, or zero value in the vote total 512 may be considered stale and purged from the queue 206 after a predetermined duration of time.

At 612, the media player module 118 may play media content to the members 110. The media player module 118 may include providing a visual display via the visualizer 224 and/or provide information about the media content in the attribute display 220. The media player module 118 may also facilitate providing substantially synchronized broadcast (e.g., distribution, streaming, etc.) of the media content to the members 110 such that the members are receiving the media content at substantially the same time thus enabling real time or near-real time posting of messages on the message board 208 in synch with the played media content and so forth.

At 614, the media player module 118 may purge media content that is played from the playlist 204 (or queue 206 when integrated with a playlist). In some instances, played media content may be restricted from being played again for at least a predetermined duration of time.

Figure 7:
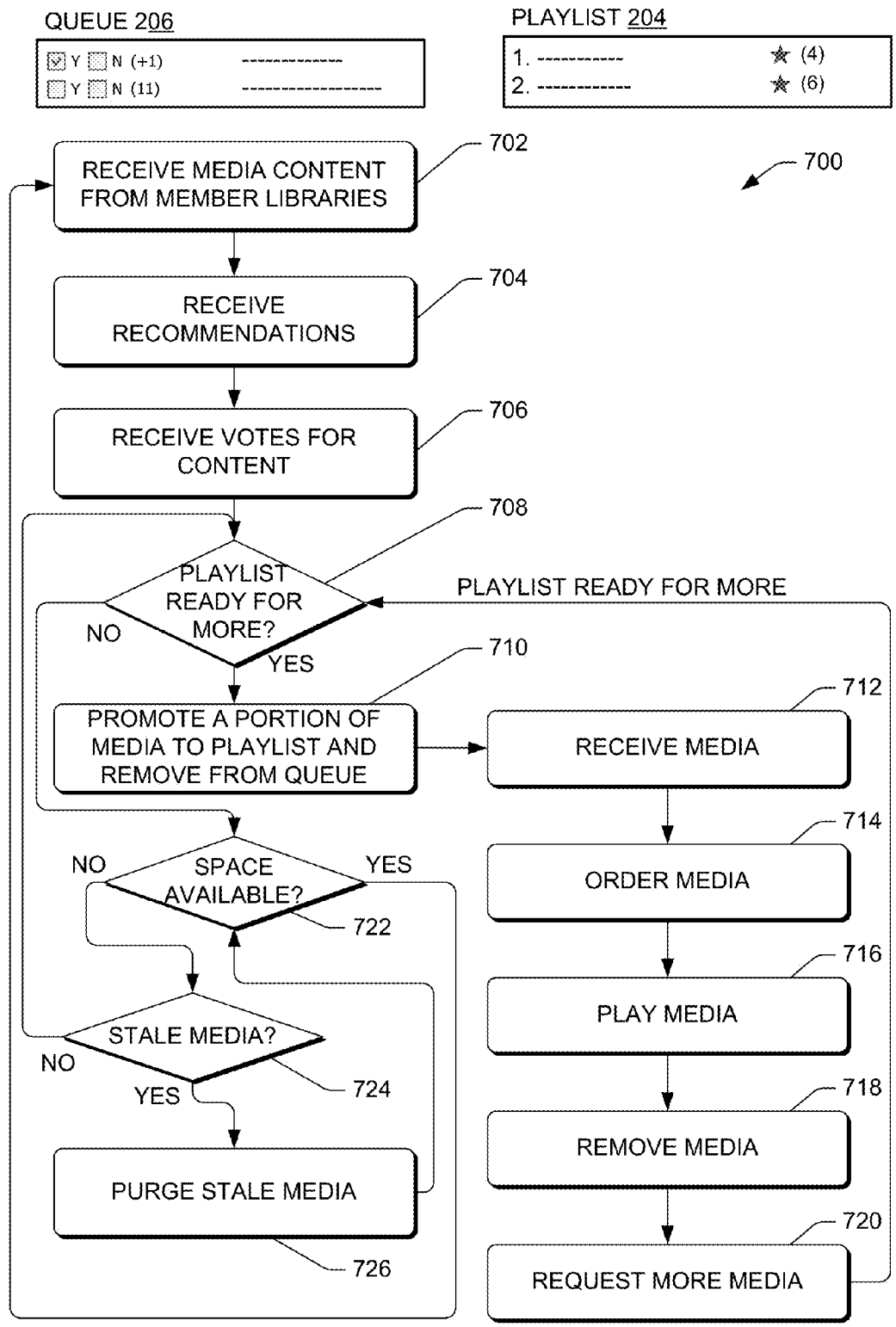
FIG. 7 is a flow diagram of an illustrative process to manage a queue and playlist of a collaborative media player.

FIG. 7 is a flow diagram of an illustrative process 700 to manage a queue and playlist of a collaborative media player. The operations of the process 700 are listed under the respective components of the queue 206 and the playlist 204 that are most likely facilitate the operations. In accordance with some embodiments, the queue module 120 may perform operations associated with the queue 206 while the media player module 118 may perform operations associated with the playlist 204.

At 702, the queue module 120 may identify (via a survey process) media content available from the member libraries. The media content may be uploaded to a host or an identifier of the media may be uploaded to enable access of a corresponding host copy of the media content (e.g., media content stored in a cloud computing environment, master library, etc.). In some embodiments, a peer-to-peer environment may be used where the media content is distributed to other member's computer devices, and stored for near synchronous play during real time (e.g., streaming) or at a later time.

At 704, the queue module 120 may receive recommendations from the recommendation module 122 for inclusion in the queue 206. The recommendation module may analyze various member activities, media content in the queue 206, and so forth to generate the recommendations.

At 706, the queue module 120 may receive votes from the members 110 for the media content. The votes may influence the eventual play of the media content by the media player 202 and/or the order of the media content in the playlist 204 or the queue 206.

At 708, the queue module 120 may determine whether the playlist 204 is ready for more pieces of media content from the queue 206. For example, when the playlist 204 has place holders for five pieces of media content and only has four pieces of media content, the playlist may be ready for an additional piece of media content from the queue 206. At 710, when the playlist is ready ("yes") from 708, the queue module 120 may promote a portion of the media content to the playlist 204 and remove the respective portion from the queue 206.

At 712, the media player module 118 may revive the media from the queue module 120. At 714, the media player module 118 may order the media content. For example, the media content from the queue 206 may enter the playlist 204 at the bottom of the playlist (last to play from current selections in the playlist), or in another position. In some embodiments, a selection may be promoted to a top position or intermediate position, and thereby demoting some or all of the other selections in the playlist, such as via a command triggered by the promotion button 218, 516.

At 716, the media player module 118 may play a piece of media content that is next in the playlist 204. The playing of media content may occur when the subsequent piece of media content finishes being played or when a threshold number of votes to skip the playing media content via the skip button 222. At 718, the media player module 118 may clear the piece of media content after it has been played or skipped. Clearing the media may include deleting a temporary copy of the media when the media content is uploaded from the member's computing devices. In some instances, clearing the media may include purging the media from cache or active memory of a host computer such as when the media is stored in a cloud computing environment.

At 720, the media player module 118 may request more media content from the queue 206 to populate the playlist 204.

At 708, when the playlist 204 is not ready ("no") for additional selections from the queue, the queue module 120 may determine whether the queue has space available at 722. When the queue 206 has space available ("yes"), then the process 700 may return to the operation 702 to replenish the queue. When no space is available ("no") in the queue 206 at 722, then the process may advance to the operation 724.

At 724, the queue module 120 may determine whether stale media content exists in the queue 206. For example, stale media content may include content that has a negative voting total that reaches a predetermined threshold, has no voting total that does not exceed a threshold after a predetermined duration of time (e.g., no rating after ten minutes in the queue, etc). When stale media content exists ("yes"), the process 700 may advance to an operation at 726 where the queue module 120 may purge the stale media content (e.g., delete from the queue and physical storage) or purge the reference to the stale media content (e.g., purge from active memory of host computer). In some instances, the stale media content may be marked at 726 to avoid adding it into the queue 206 at a later time (but possibly overridden by a member). After purging the stale media content, the process 700 may return to the decision at 722 and proceed accordingly. When no stale media content exists at 724 ("no"), then the process 700 may return to the decision 708 and proceed accordingly.

Figure 8:
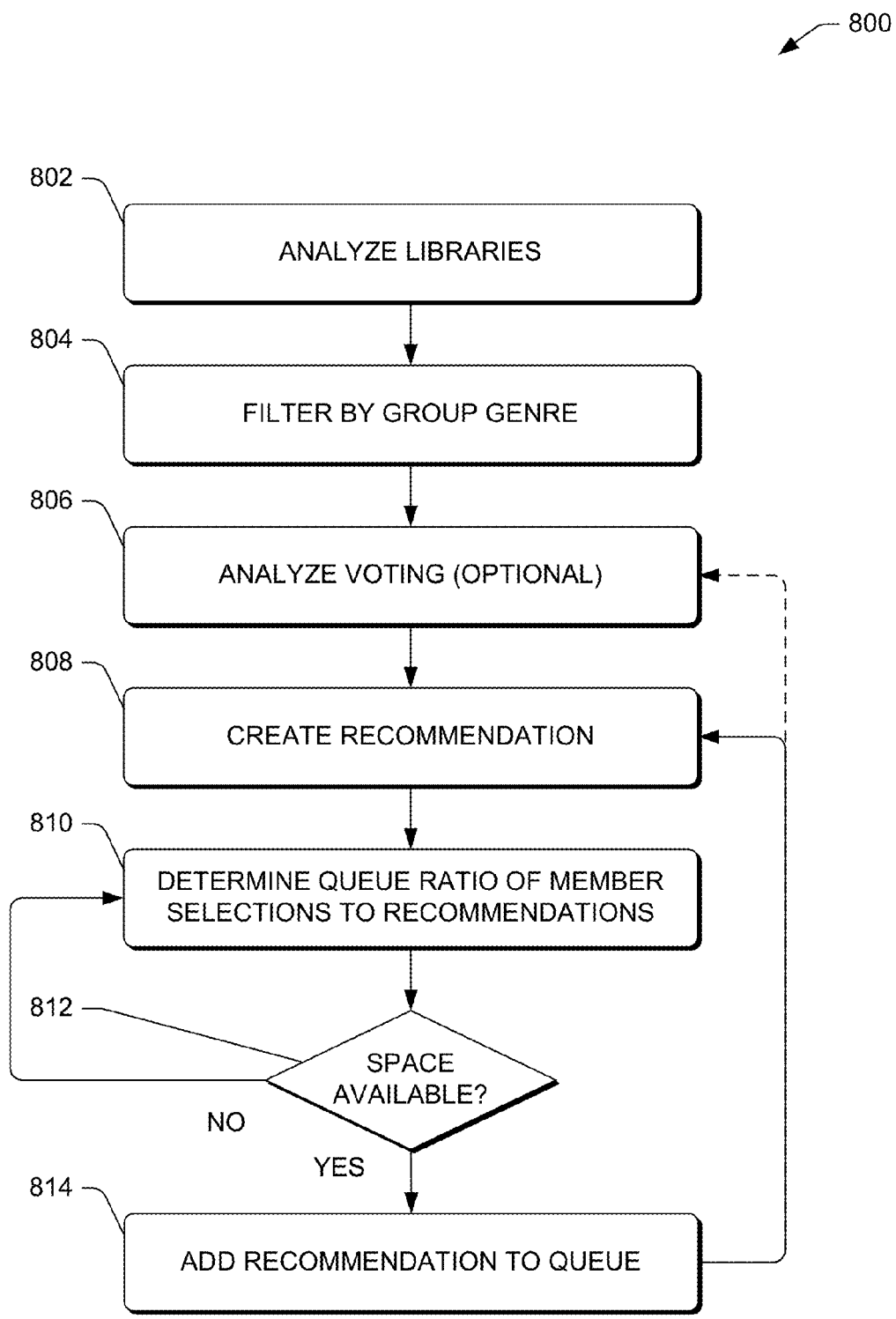
FIG. 8 is a flow diagram of an illustrative process to add recommendations to a queue based on group attributes and/or activity.

FIG. 8 is a flow diagram of an illustrative process 800 to add recommendations to a queue based on group attributes and/or activity.

At 802, the recommendation module 122 may analyze the member libraries 402. At 804, the recommendation module 122 may filter possible recommendations by the theme 232 of the virtual lounge 200. At 806, the recommendation module 122 may optionally analyze voting and member collaboration of the members 110 of the virtual lounge 200. At 808, the recommendation module 122 may create a recommendation (one of the recommendations 230).

At 810, the recommendation module 122 may determine a queue ratio of member selections to the recommendations 230. For example, when the queue 206 has fulfilled a quota of the recommendations 230 based on the media content selection 326 of the group initiation 300, the queue may not have space for another recommendation until the members 110 add more member selections to the queue 206 (e.g., received at operations 604, 704). In some embodiments, the recommendations 230 may be added to the queue 206 to maintain a threshold number of selections of media content in the queue 206, such as to preventing the queue from emptying.

At 812, the recommendation module 122 may determine if space is available for a new recommendation in the queue 206 based on the queue ratio determined at 810. When no space is available ("no"), the process 800 may cycle back to 810, potentially after a delay, to determine the queue ratio again. When space is available in the queue 206 for a recommendation, the process 800 may proceed to operation 814 where the recommendation module 122 may add the recommendation to the queue. The process 800 may continue by returning to the operation 806 (when voting analysis is used) or the operation 808 and proceeding accordingly.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
  connecting a plurality of user devices in a networked environment, the networked environment including:
    a media player to play a piece of media content selectable from a playlist and to enable substantially synchronized distribution of the piece of media content to the plurality of user devices during the play of the piece of media content; and
    a message board to enable a plurality of users to communicate among one another while the plurality of user devices receive the piece of media content in the networked environment, the plurality of users including a group of users that purchased the piece of media content;
  surveying pieces of media content from media libraries of individual ones of the plurality of users, the pieces of media content made selectable for inclusion in a first population of media content of a queue that feeds one or more pieces of media content to a second population of media content of the playlist, wherein the first population of media content is separate from the second population of media content; and
  moving the piece of media content from a position in the playlist to another position in the playlist in response to determining that a threshold number of users of the group of users that purchased the piece of media content indicate that the piece of media content is to be moved.

2. The method as recited in claim 1, further comprising generating at least one recommendation to add to the queue, the recommendation being a particular piece of media content that is related to one or more pieces of media content of the queue and absent from the media libraries of the users.

3. The method as recited in claim 2, wherein the recommendation is based at least in part on activity of the plurality of users within the networked environment.

4. The method as recited in claim 1, further comprising receiving input from individual users of the plurality of users as to one or more pieces of media content to be transferred from the queue to the playlist.

5. The method as recited in claim 4, wherein receiving input includes receiving votes from the individual users of the plurality of users, wherein the votes influence a change to the pieces of media content in the playlist.

6. The method as recited in claim 5, wherein the change to the playlist includes a removal of an additional piece of media content from the playlist.

7. The method as recited in claim 1, wherein the message board includes tags associating member comments with the piece of media content being played by the media player.

8. The method as recited in claim 1, wherein the playlist is a sequential playlist to order the pieces of media content that are to be played by the media player.

9. The method as recited in claim 1, wherein the connecting the plurality of users in the networked environment includes connecting the plurality of users in a peer-to-peer networked environment.

10. A system, comprising:
  one or more processors; and
  a non-transitory memory to store computer executable instructions that, when executed by the one or more processors, performs acts including:
    hosting user devices of a plurality of users in a networked environment;
    compiling a queue of media content files based on media content files stored in a plurality of user storage locations of the plurality of users;
    assigning a corresponding number of votes to multiple users in the plurality of users, the votes influencing at least one of inclusion of media content files in the queue or a sequential order of the media content files in the queue;
    providing a message board for the multiple users to trade the votes that influence the media content files for inclusion in the queue or the sequential order of the media content files in the queue; and
    playing one or more media content files in the queue on the user devices based at least in part on votes received from for the plurality of users.

11. The system as recited in claim 10, wherein compiling the queue of media content files includes surveying the plurality of user storage locations to identify media content files stored in the plurality of user storage locations, and placing an identifier of each identified media content file in the queue.

12. The system as recited in claim 10, wherein the compiling the queue of media content files includes receiving a media content file from a user storage location of a user.

13. The system as recited in claim 10, wherein the instructions further comprise posting real time or near-real time messages generated by at least one user at one or more of the user devices on the message board.

14. The system as recited in claim 13, wherein a message includes a tag that associates the message with a media content file that is played by a posting time of the message.

15. The system as recited in claim 10, wherein a media content file is placed in the queue in response to the media content file receiving a predetermined number of votes.

16. The system as recited in claim 10, wherein the votes are allocated to the plurality of users based at least on ownership privileges of the media content files.

17. The system as recited in claim 10, wherein the sequential order of the media content files in the queue is determined based on at least on a number of votes received by one or more media content files in the queue.

18. The system as recited in claim 10, further comprising purging a media content file that received a number of votes that is below a threshold during a predetermined period of time from the queue.

19. The system as recited in claim 10, wherein the instructions further comprise updating the media content files owned by the plurality of users based in part on a purchase of an additional piece of media content via the system.

20. The system as recited in claim 10, wherein the playing the one or more media content files includes playing at least one of an audio file or a video file.

21. A non-transitory computer readable media storing a user interface (UI), the UI comprising:
    - a media player interface of a media player that plays media content for distribution to a group of users;
    - a message board interface of a message board that enables communications among the group of users;
    - a queue interface that displays one or more pieces of media content in a queue for presentation by the media player, the queue interface displaying at least one of:
        - a piece of media content owned by at least one first user of the group of users, or
        - at least one recommended piece of media content related to media content owned by at least one second user of the group of users; and
    - a playlist interface of a playlist that is populated by an additional piece of media content that is moved from the queue interface to the playlist interface in response to a threshold number of one or more users of the group of users indicating that the additional piece is to be moved, the queue interface being separate from the playlist interface in the UI.

22. The non-transitory computer readable media as recited in claim 21, wherein the UI further comprises a member link that enables a user to view users in the group of users.

23. The non-transitory computer readable media as recited in claim 21, wherein the UI further comprises a voting input to enable individual ones of the group of users to collaboratively select the media content from the queue for inclusion to the playlist.

24. The non-transitory computer readable media as recited in claim 21, wherein the message board interface includes a tag to associate a message with a piece of media content being played by the media player.

25. The non-transitory computer readable media as recited in claim 21, wherein the media player interface includes a skip command that enables individual ones of the group of users to skip a currently played selection of media content when an additional threshold number of the one or more users select the skip command.

26. The non-transitory computer readable media as recited in claim 21, wherein the UI further comprises a link to enable individual ones of the group of users to purchase the at least one recommendation.

\* \* \* \* \*